United States Patent
Long

(10) Patent No.: US 10,077,021 B2
(45) Date of Patent: Sep. 18, 2018

(54) TWO STEP SMART KEY START SYSTEM

(71) Applicant: Donna Long, Wichita Falls, TX (US)

(72) Inventor: Donna Long, Wichita Falls, TX (US)

(*) Notice: Subject to any disclaimer, the term of this patent is extended or adjusted under 35 U.S.C. 154(b) by 253 days.

(21) Appl. No.: 14/036,250

(22) Filed: Sep. 25, 2013

(65) Prior Publication Data
US 2017/0267212 A1  Sep. 21, 2017

Related U.S. Application Data

(62) Division of application No. 12/858,071, filed on Aug. 17, 2010, now Pat. No. 8,548,645.

(60) Provisional application No. 61/234,434, filed on Aug. 17, 2009.

(51) Int. Cl.
*G06F 7/00* (2006.01)
*B60R 25/045* (2013.01)

(52) U.S. Cl.
CPC .............. *B60R 25/045* (2013.01); *G06F 7/00* (2013.01); *Y10T 70/5956* (2015.04)

(58) Field of Classification Search
CPC ........ B60R 25/04; B60R 25/066; B60R 25/00
USPC ............................ 701/2; 307/10.1, 10.4, 10.6
See application file for complete search history.

(56) References Cited

U.S. PATENT DOCUMENTS

| | | | | |
|---|---|---|---|---|
| 5,150,593 A * | 9/1992 | Kobayashi | ............ | B60R 25/066 192/219.4 |
| 6,038,666 A * | 3/2000 | Hsu | ..................... | G07C 9/00087 380/285 |
| 6,236,120 B1 * | 5/2001 | Loraas | .................... | B60R 25/04 307/10.1 |
| 6,274,946 B1 * | 8/2001 | Maeda | ................. | B60Q 1/1476 307/10.1 |
| 6,653,747 B1 * | 11/2003 | Proefke | ................... | B60R 25/24 307/10.6 |
| 6,727,800 B1 * | 4/2004 | Dutu | ................. | B60R 25/02102 123/179.1 |
| 7,392,675 B2 * | 7/2008 | Kito | ....................... | B60R 25/04 307/10.5 |
| 8,011,214 B2 * | 9/2011 | Katagiri | .................... | B60R 7/04 70/252 |
| 8,193,915 B2 * | 6/2012 | McCall | ............... | B60R 25/2009 340/10.1 |
| 2005/0166650 A1 * | 8/2005 | Shimura | ................. | B60R 25/04 70/252 |
| 2009/0151412 A1 * | 6/2009 | Chung | .................. | B60R 25/066 70/247 |
| 2011/0040426 A1 * | 2/2011 | Long | ..................... | B60R 25/045 701/2 |

* cited by examiner

*Primary Examiner* — Thomas G Black
*Assistant Examiner* — Wae L Louie
(74) *Attorney, Agent, or Firm* — Braxton Perrone, PLLC

(57) ABSTRACT

A keyless ignition start system in which authentication of a coded key fob is carried out twice, first to activate the ignition switch to allow starting the engine and second at the time when the brake pedal is depressed to put the car in a drive gear. The two step authentication prevents driving off a car which has been started without having the key fob for security purposes and also to avoid inconvenient situations that can otherwise occur.

37 Claims, 2 Drawing Sheets

TWO STEP SMART KEY START SYSTEM

CROSS REFERENCE TO RELATED APPLICATION

This application is a divisional of U.S. Ser. No. 12/858,071 filed Aug. 17, 2010 claims the benefit of U.S. provisional application No. 61/234,434 filed on Aug. 17, 2009.

BACKGROUND OF THE INVENTION

This invention concerns keyless automobile lock and ignition systems (often referred to as smart key) in which the presence of a key fob is electronically detected by means of a radio pulse transponder in the key fob and antennas in the car body. In these systems, the car is unlocked automatically when the handle is operated or a button pushed. Locking is accomplished in a similar way or by simply walking away.

The ignition switch is also operated without the need to insert a key into the ignition switch lock by the same wireless detection of the presence of the key fob in the passenger compartment. The system neutralizes the electronic immobilizer usually now included in automobile electronics and allows starting the car by simply pushing a button or turning the ignition switch without the need to insert a key into the switch.

While very convenient, this system creates possibilities of security risks and also allows inconvenient situations to inadvertently arise.

For example, if after starting, the driver momentarily exits the car and somehow leaves the key fob somewhere before reentering the car, he or she can drive off, and then after reaching a destination cannot restart the car since the key fob is not present. A manual operation using the key is also not possible if the key is left with the fob.

While a warning message is displayed on the instrument panel in some designs, indicating that the key fob is not detected by the system, it is easy to not notice this displayed message which may be blocked by the steering wheel.

In another common situation which could be encountered, if a driver allows a valet attendant to drive off with the car, if the driver does not give the key fob to the attendant, the attendant will be unable to start the car when retrieving the car until after obtaining the key fob from the driver, slowing the return of the car to the driver.

Also, if the valet forgets to surrender the key fob to the owner, the owner can unknowingly drive away without the key fob and subsequently be unable to restart the car with the car (which usually is left running while the attendant gets out and the owner enters the car).

Security risks can also arise, as where a car is inadvertently left running (which can be very quiet and nearly undetectable in many cars) and with the doors unlocked, such that a thief can simply enter and drive off in the car.

With newer locking systems, it is easy for a driver to think the car has been locked when in fact the locking has not been accomplished.

Again, beep cues or visual displays can easily be missed, particularly when a driver is in a hurry.

It is also known to lock the transmission shift lever until the key fob is authenticated by the smart key controller system as described in U.S. 2009/0151412A1. However, once authentication has occurred in that system, the transmission shift lever can be freely operated such that the above problems are still encountered.

Accordingly, it is an object of the present invention to provide a keyless or smart key system of the type described which has a fail-safe feature that insures that the above described inconvenience or security risk situations are positively prevented without the need for particular attentiveness of the driver the location of the key fob on to related beep cues or displays.

SUMMARY OF THE INVENTION

The above recited object and other objects which will be understood upon a reading of the following specification and claims are achieved by a two-step detection authentication process in which after the presence of the key fob initially authenticated, the ignition button or switch is activated for keyless starting as in prior systems. A shift lever interlock is also included, controlled by the keyless system controller, positively preventing shifting of the transmission shift lever into a drive gear unless the owner's key-fob is detected by the system as being present within the passenger compartment at the time the driver presses the brake pedal in order to allow shifting into a drive gear.

Thus, if the car is started and idling in park (or neutral), the shift lever cannot be shifted into a drive gear, positively preventing driving the car away unless the key-fob is detected and authenticated by the system at the same time as the shifting attempt is made.

This positively prevents the inconvenient situations and security risks arising from a car being able to be driven away without the key-fob being located in the passenger compartment of the car, such that the attentiveness of the operator is not required in order to insure that such situations will not arise.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
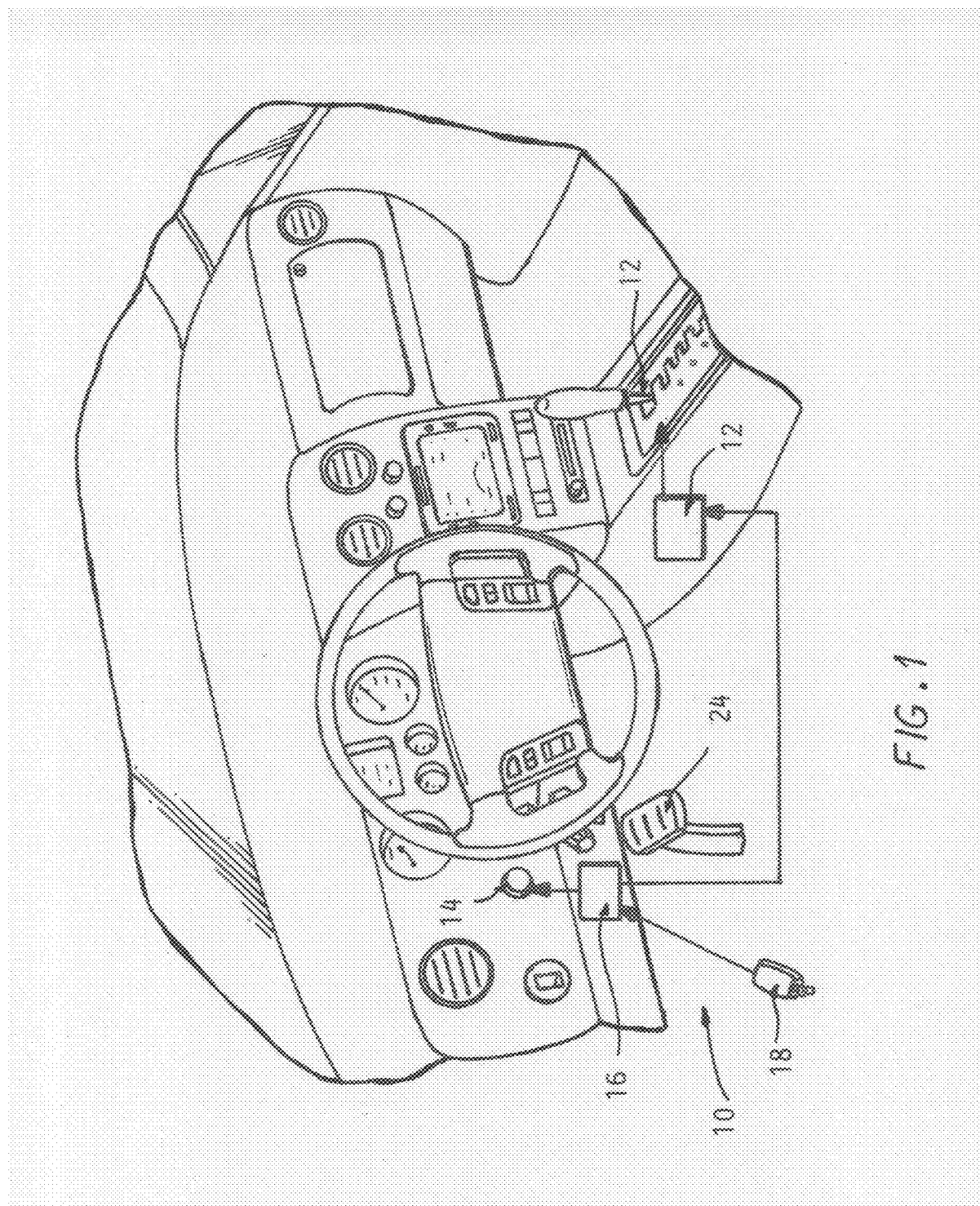
FIG. 1 is a pictorial diagrammatic view of a portion of the passenger compartment of an automobile with keyless system components included according to the present invention being depicted diagrammatically.
Figure 2:
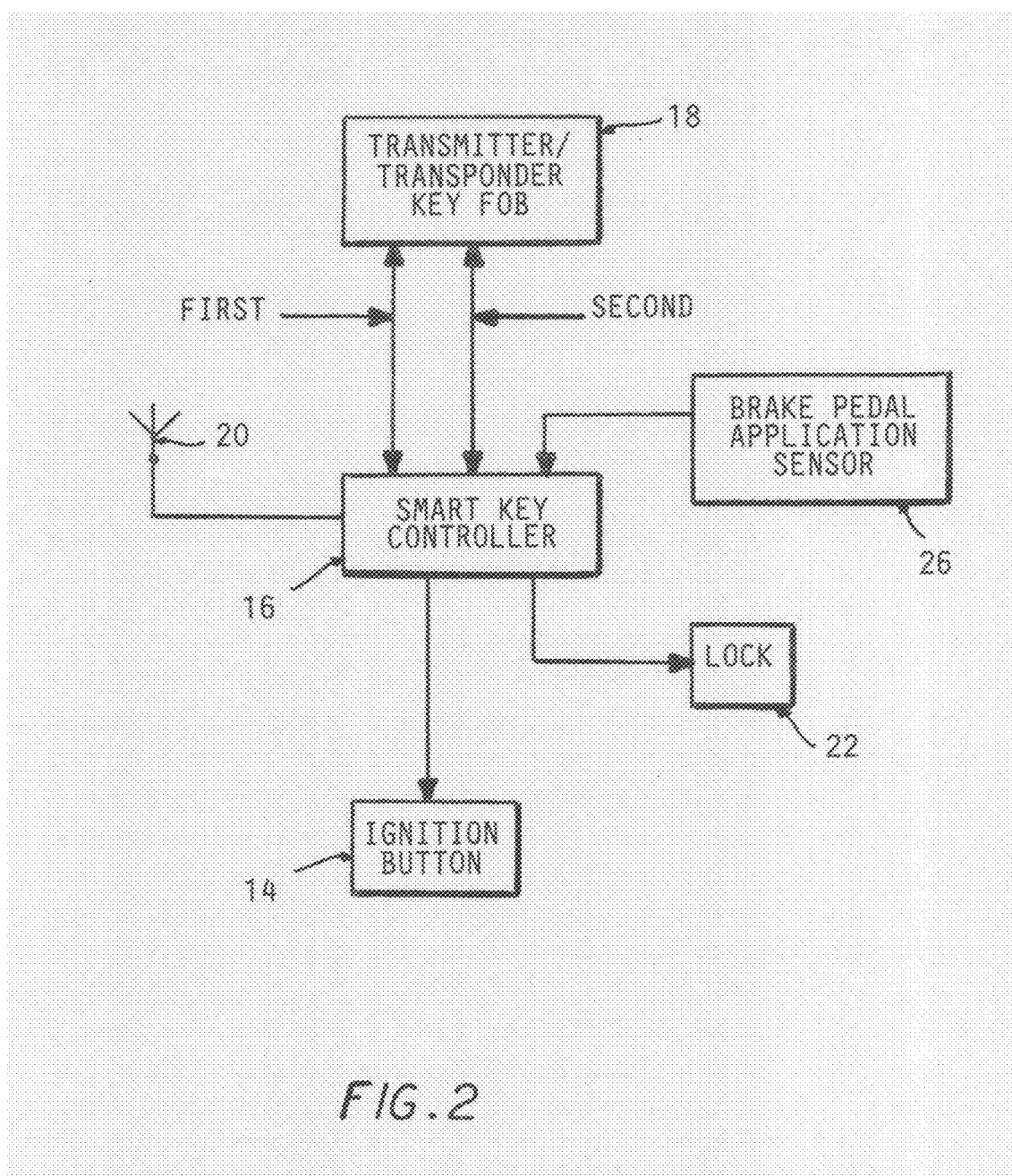
FIG. 2 is a block diagram of components of the keyless system depicting the two step detection authentication operation of the invention.

Referring to FIG. 1, a portion of the interior of an automobile passenger compartment 10 is shown in fragmentary form.

A center console mounted transmission shift lever 12 is provided in conventional fashion. A dash mounted starter button 14 is provided (or a turnable ignition switch which could also accept a key). A keyless system controller 16 is depicted diagrammatically which detects the presence of a coded key fob 18 in the passenger compartment 10 as by one or more car body mounted antennas 20 receiving transponder coded pulse codes transmitted by the key-fob 18 when interrogated by the smart key controller 16 in the well known manner.

The system controller 16 enables the ignition push button 14 when the presence of the correctly coded key fob 18 in the compartment 10 is detected and authenticated, such that the car can be started by merely pushing the button 14 without the use of a key, in the well known manner.

According to the present invention, a transmission lever lock 22 is provided, such as described in U.S. 2009/0151412A1, which positively prevents movement of the transmission selector or shift lever 12 to a drive position unless the brake pedal 24 is depressed and also unless the key fob 18 in the passenger compartment 12 is again detected and authenticated by the system controller 16.

According to the invention, such detection-authentication necessary to shift the lever 12 is not carried out at the same time as when the ignition detection-authentication is carried out. This second authentication is carried out at the time the brake pedal is pressed and a signal is generated and sent by a sensor 26 which detects the pressing of the brake pedal 24 to the smart key controller 22, which carries out a second detection authentication of the key fob 18 prior to operating the release of the transmission lever lock actuator 22.

Thus, if the key fob 18 is removed from the passenger compartment 10 after the car is started, the vehicle will not be able to be operated as the transmission lever 12 will remain locked even when the brake pedal is pressed.

This prevents operation of the vehicle even after the key fob 18 has been initially authenticated and the car started and running, and thus positively prevents operation of the vehicle unless the key fob 18 is authenticated as being within the passenger compartment.

The invention claimed is:

1. A smart key system for a vehicle comprising a coded key fob able to be detected and authenticated within a passenger compartment and authenticated by a smart key system controller and enabling an ignition switch to start the engine, the vehicle comprising an engine, a transmission, a brake pedal and a transmission operating lever, a transmission operating lever lock actuator and a lever lock preventing shifting until the brake pedal is depressed, wherein the smart key controller again detects and authenticates the presence of the coded key fob in the passenger compartment at the time the brake pedal is depressed prior to activation of the transmission operating lever lock actuator and release of the lever lock and allowing shifting into gear.

2. The system of claim 1, wherein the smart key controller prevents operation of the transmission lever lock actuator to release the lock lever even when the brake pedal is depressed with the engine started in the absence of detection and authentication of the coded key fob.

3. The system of claim 1, wherein the transmission lever is locked after starting the engine and release of the depressed brake pedal to prevent driving the vehicle after the engine is initially started and the brake pedal is depressed by a driver without the coded key being detected in the passenger compartment after starting of the engine.

4. A system for operating a vehicle comprising:
a key comprising at least one electronic code; and
a controller configured to authenticate and detect the key, wherein the vehicle comprises:
a vehicle movement selector; and
a brake system,
wherein the controller is configured to perform a first detection and authentication of the at least one electronic code at the time the vehicle starter activation is attempted and a second detection and authentication of the at least one electronic code upon activation of the brake system after the vehicle is started, and
wherein the controller is configured to enable use of the vehicle movement selector following the second detection and authentication of the at least one electronic code.

5. The system of claim 4, wherein the first detection and authentication of the at least one electronic code enabling activation of the vehicle starter comprises detection of the key within the passenger compartment of the vehicle.

6. The system of claim 4, wherein the second detection and authentication of the at least one electronic code enabling use of the vehicle movement selector comprises detection of the key within the passenger compartment of the vehicle.

7. The system of claim 4, wherein the second detection and authentication of the at least one electronic code enabling use of the vehicle movement selector comprises detection of the key within the passenger compartment of the vehicle when a person is within the passenger compartment of the vehicle.

8. The system of claim 4, wherein the at least one electronic code authenticated in the first authentication is the same as the at least one electronic code authenticated in the second authentication.

9. The system of claim 4, wherein the at least one electronic code authenticated in the first authentication differs from the at least one electronic code authenticated in the second authentication.

10. The system of claim 4, wherein the key is a digital key.

11. The system of claim 4, wherein the key is a mobile coded key.

12. The system of claim 4, wherein the key communicates wirelessly with the controller.

13. The system of claim 4, wherein the key is a connected key.

14. A system for operating a vehicle having an engine, transmission, and brake pedal comprising:
a key able to be detected and authenticated within a passenger compartment and authenticated by a controller and enabling an ignition switch to start the engine, the vehicle comprising:
a transmission operating lever enabling shifting the transmission into gear; and
a lever lock preventing movement of the transmission lever to shift into gear until the brake pedal is depressed,
wherein a two step key authentication is required in which the controller detects and authenticates the presence of the key at the time the engine is started and again attempts to detect and authenticate the presence of the key in the passenger compartment whenever the brake pedal is depressed, which only if the key is detected and authenticated causes operation of the transmission lever lock actuator to release the lock lever and thereby allow the transmission lever to be moved to shift the transmission into gear,
wherein the controller prevents operation of the transmission lever lock actuator to release the lock lever even when the brake pedal is depressed with the engine started in the absence of detection and authentication of the key, and
wherein the transmission lever is locked after starting the engine and release of the depressed brake pedal to prevent driving the vehicle after the engine is initially started and the brake pedal is depressed by a driver without the key being detected in the passenger compartment after starting of the engine.

15. A system for starting and operating a vehicle comprising:
- a detectable coded token;
- a controller configured to detect and authenticate the detectable coded token and enable activation of a vehicle starter,
- the vehicle comprising:
- a vehicle movement selector; and
- a brake system,
- wherein the controller is configured to perform a first detection and authentication of the detectable coded token at the time the vehicle starter activation is attempted and a second detection and authentication of the detectable coded token upon activation of the brake system, and
- wherein the controller is configured to only enable use of the vehicle movement selector following the second detection and authentication of the coded token.

16. The system of claim 15, wherein the controller prevents operation of the vehicle movement selector when the brake system is activated with the vehicle starter in the absence of detection and authentication of the detectable coded token.

17. The system of claim 15, wherein the vehicle movement selector is inoperable after starting the vehicle and deactivation of the brake system to prevent movement of the vehicle after the vehicle is initially started and the brake system is activated by a user without the detectable coded token being detected in a vehicle passenger compartment after starting the vehicle.

18. The system of claim 15, wherein the second detection and authentication of the detectable coded token enabling use of the vehicle movement selector comprises detection of the detectable coded token within a vehicle passenger compartment.

19. The system of claim 15, wherein the second detection and authentication of the detectable coded token enabling use of the vehicle movement selector comprises detection of the detectable coded token within the passenger compartment of the vehicle when a person is within a vehicle passenger compartment.

20. A system for starting and operating a vehicle comprising:
- a key;
- a brake system; and
- a controller configured to detect and authenticate the key,
- wherein the controller is further configured to perform a first detection and authentication of the key when activation of the vehicle starter is attempted and a second detection and authentication of the key upon activation of the brake system with the vehicle in a stationary position, and
- wherein the controller only enables vehicle movement following the second detection and authentication of the key.

21. The system of claim 20, wherein the controller prevents operation of a vehicle movement selector when the brake system is activated with the vehicle started in the absence of detection and authentication of the key.

22. The system of claim 20, wherein a vehicle movement selector is inoperable after starting the vehicle and deactivation of the brake system to prevent movement of the vehicle after the vehicle is initially started and the brake system is activated by a user without the key being detected in a vehicle passenger compartment after starting the vehicle.

23. The system of claim 20, wherein the second detection and authentication of the key enabling use of a vehicle movement selector comprises detection of the key within a vehicle passenger compartment.

24. The system of claim 20, wherein the second detection and authentication of the key enabling use of a vehicle movement selector comprises detection of the key within the passenger compartment of the vehicle when a person is within a vehicle passenger compartment.

25. The system of claim 20, wherein the key is a digital key.

26. The system of claim 20, wherein the key is a mobile coded key.

27. The system of claim 20, wherein the key communicates wirelessly with the controller.

28. The system of claim 20, wherein the key is an electronic key code.

29. The system of claim 20, wherein the key is a connected key.

30. A system for operating a vehicle comprising:
- a key comprising a first electronic code and a second electronic code; and
- a controller configured to detect and authenticate the key of the vehicle and enable activation of a vehicle starter,
- wherein the vehicle comprises:
- a vehicle movement selector; and
- a brake system,
- wherein the controller is configured to perform a detection and an authentication of the first electronic code at the time the vehicle starter activation is attempted and a detection and an authentication of the second electronic code upon activation of the brake system with the vehicle in a stationary position after the vehicle is started, and
- wherein the controller enables use of the vehicle movement selector following the authentication of the second electronic code.

31. The system of claim 30, wherein the detection and authentication of the first electronic code enabling activation of the vehicle starter comprises detection of the key within the passenger compartment of the vehicle.

32. The system of claim 30, wherein the detection and authentication of the second electronic code enabling use of the vehicle movement selector comprises detection of the key within the passenger compartment of the vehicle.

33. The system of claim 30, wherein the detection and authentication of the second electronic code enabling use of the vehicle movement selector comprises detection of the key within the passenger compartment of the vehicle when a person is within the passenger compartment of the vehicle.

34. The system of claim 30, wherein the key is a digital key.

35. The system of claim 30, wherein the key is a mobile coded key.

36. The system of claim 30, wherein the key communicates wirelessly with the controller.

37. The system of claim 30, wherein the key is a connected key.

* * * * *